United States Patent
Wu et al.

(10) Patent No.: US 9,641,214 B2
(45) Date of Patent: May 2, 2017

(54) PORTABLE ELECTRONIC DEVICE (71) Applicant: PEGATRON CORPORATION, Taipei (TW)

(72) Inventors: Chien-Yi Wu, Taipei (TW); Chao-Hsu Wu, Taipei (TW); Shang-I Lin, Taipei (TW); Tse-Hsuan Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 15/097,295

(22) Filed: Apr. 13, 2016

(65) Prior Publication Data
US 2016/0329925 A1 Nov. 10, 2016

(30) Foreign Application Priority Data
May 8, 2015 (TW) ............... 104114765 A (51) Int. Cl.
*H04B 1/44* (2006.01)
*H04B 1/48* (2006.01)
*H01Q 1/24* (2006.01)
*H04B 1/00* (2006.01)
*H04B 1/3827* (2015.01)
*H01Q 9/04* (2006.01)

(52) U.S. Cl.
CPC ............ *H04B 1/48* (2013.01); *H01Q 1/243* (2013.01); *H01Q 9/0442* (2013.01); *H04B 1/006* (2013.01); *H04B 1/3827* (2013.01); *H01Q 9/0421* (2013.01); *H04B 2001/485* (2013.01)

(58) Field of Classification Search
USPC ......................................................... 455/83
See application file for complete search history.

(56) References Cited

U.S. PATENT DOCUMENTS

| | | | |
|---|---|---|---|
| 6,016,108 A | 1/2000 | Terk et al. | |
| 2002/0123313 A1 | 9/2002 | Hayakawa et al. | |
| 2002/0180650 A1 | 12/2002 | Pankinaho et al. | |
| 2009/0017772 A1 | 1/2009 | Kemmochi et al. | |
| 2010/0141233 A1 | 6/2010 | Kwok | |
| 2012/0019420 A1* | 1/2012 | Caimi | H01Q 1/243 343/702 |
| 2013/0154894 A1* | 6/2013 | Caimi | H01Q 1/243 343/858 |
| 2014/0292598 A1 | 10/2014 | Bevelacqua et al. | |
| 2016/0036127 A1* | 2/2016 | Desclos | H01Q 5/328 343/745 |

FOREIGN PATENT DOCUMENTS

| | | |
|---|---|---|
| EP | 0993070 A1 | 4/2000 |
| TW | 201320469 A1 | 5/2013 |

* cited by examiner

*Primary Examiner* — Fayyaz Alam
(74) *Attorney, Agent, or Firm* — CKC & Partners Co., Ltd.

(57) ABSTRACT

A portable electronic device includes an antenna unit, a processor, a circuit board and a frequency switching circuit. The antenna unit includes a pin. The processor includes a signal control terminal to output a voltage control signal. The frequency switching circuit is disposed on the circuit board and connected to the signal control terminal and the pin, so as to switch the frequency of the antenna unit according to the voltage control signal. The frequency switching circuit includes a switch unit and an anti-noise unit. The switch unit is connected to the pin, and the anti-noise unit is connected to the signal control terminal and the switch unit.

11 Claims, 6 Drawing Sheets

PORTABLE ELECTRONIC DEVICE

This application claims priority to Taiwanese Application Serial Number 104114765, filed May 8, 2015, which is herein incorporated by reference.

BACKGROUND

Technology Field

The present disclosure relates to communication devices. More particularly, the present disclosure relates to a portable electronic device and its frequency switching circuit for an antenna.

Description of Related Art

In wireless communication, an antenna of a portable electronic device for transmitting and receiving radio waves is undoubtedly an important component. In recent years, a variety of communications systems and applications are developed, and the antenna is designed toward multi-band for covering a plurality of operating frequency bands.

The conventional multi-band portable electronic device has adjustable antenna architecture capable of adjusting frequency. In one conventional adjustable antenna structure, the antenna and an adjustment means (e.g., switches) are configured to adjust the path to the antenna. However, since the adjustment means is a non-linear element with too large power of the antenna, the adjustment means generates electromagnetic interference (EMI) and therefore causes harmonic distortion to affect the efficiency of the antenna.

In another conventional adjustable antenna structure, the antenna is coupled with a variable capacitance chip to switch the frequency of the antenna by using different capacitance values. However, due to the switching path through the chip, the adjustable antenna with the variable capacitance chip may cause path loss.

In view of the foregoing, there is an urgent need in the related field to achieve requirements of operating bandwidth of the portable electronic device and to extend or adjust the operating bandwidth.

SUMMARY

The following presents a simplified summary of the disclosure in order to provide a basic understanding to the reader. This summary is not an extensive overview of the disclosure and it does not identify key/critical components of the present disclosure or delineate the scope of the present disclosure. Its sole purpose is to present some concepts disclosed herein in a simplified form as a prelude to the more detailed description that is presented later.

According to embodiments of the present disclosure, the present disclosure provides a portable electronic device including an antenna unit, a processor, a circuit board and a frequency switching circuit. The antenna unit comprises the pin. The processor comprises the signal control terminal and is configured to output the voltage control signal. The frequency switching circuit is disposed on the circuit board and connected to the signal control terminal and the pin so as to switch the frequency of the antenna unit according to the voltage control signal. The frequency switching circuit comprises a switch unit and an anti-noise unit. The switch unit is coupled with the pin, and the anti-noise unit is coupled with the signal control terminal and the switch unit.

Accordingly, in one portable communication device, the frequency switching circuit is disposed on the circuit board, and the processor outputs the voltage control signal to switch the conducting state of the frequency switching circuit, so as to adjust the grounding path of the antenna of the portable communication device for improving frequency modulation effect. Moreover, the frequency switching circuit comprises the anti-noise unit to isolate the antenna from the processor, so as to prevent noise of the processor from adversely affecting the antenna efficiency or prevent a high-frequency signal of the antenna from adversely affecting the operations of the processor. Thus, the frequency switching circuit disposed on the circuit board can performs frequency modulation on the portable communication device, without adding the adjustment means or the variable capacitance chip. In this way, design costs for portable communication devices can be reduced, and unnecessary EMI or path loss can be avoided.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

In the following detailed description, for purposes of explanation, numerous specific details are set forth in order to attain a thorough understanding of the disclosed embodiments. In accordance with common practice, like reference numerals and designations in the various drawings are used to indicate like elements/parts. Moreover, well-known elements or method steps are schematically shown or omitted in order to simplify the drawing and to avoid unnecessary limitation to the claimed invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
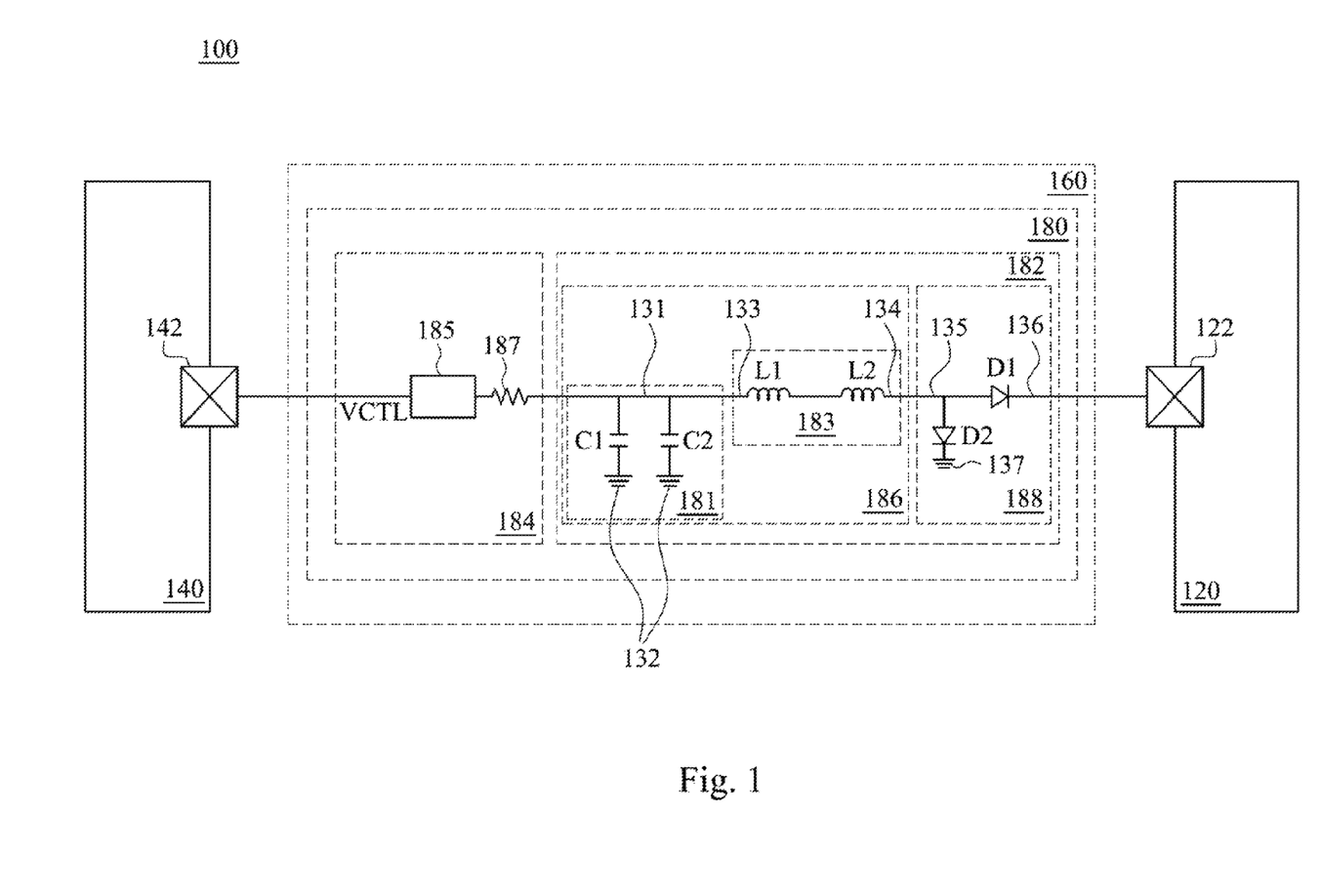
FIG. 1 is a schematic circuit diagram of a portable communication device according to one embodiment of the present disclosure.

FIG. 1 is a schematic circuit diagram of a portable communication device according to one embodiment of the present disclosure. As illustrated in FIG. 1, the portable communication device 100 includes an antenna unit 120, a processor 140, a circuit board 160 and at least one frequency switching circuit 180. In some embodiments, the portable communication device 100 is a portable electronic device.

The functions of portable communication device 100 are detailed in one or more embodiments as below. However, the present disclosure is not limited to the following embodiments.

In one embodiment, as illustrated in FIG. 1, the antenna unit 120 includes at least one pin 122, the processor 140 includes a signal control terminal 142 configured to output a voltage control signal VCTL. The frequency switching circuit 180 is disposed on the circuit board 160 and switches the operation frequency of the switch the antenna unit 120 according to the voltage control signal VCTL. The frequency switching circuit 180 includes a switch unit 182 and an anti-noise unit 184.

In one embodiment, the switch unit 182 is closer to the antenna unit 120 than to the anti-noise unit 184. A high-frequency signal of the antenna unit 120 adversely affects the processor 140, and a high-frequency noise of the processor 140 adversely affects the efficiency of the antenna unit 120. Therefore, the anti-noise unit 184 is closer to one terminal of the processor 140 so as to isolate the high-frequency signal of the antenna unit 120 and the high-frequency noise of the processor 140.

In one embodiment, the switch unit 182 may include a low pass filter 186 and a switch circuit 188. The low pass filter 186 is coupled with the anti-noise unit 184 and the switch circuit 188 and configured to isolate noise from the processor 140 and the antenna unit 120. The switch circuit 188 may include a first end 135, a second end 136 and a third end 137. The first end 135 is coupled with the low pass filter 186. The second end 136 is coupled with the pin 122. The third end 137 is coupled with ground.

In one embodiment, the switch circuit 188 may at least include a first diode D1 and a second diode D2. As illustrated in FIG. 1, each of the first diode D1 and the second diode D2 includes an anode and a cathode, where the anode of the first diode D1 and the anode of the second diode D2 are coupled with the first end 135 of the switch circuit 188, the cathode of the first diode D1 is coupled with the third end 137 of the switch circuit 188, and the cathode of the second diode D2 is coupled with the pin 122.

In one embodiment, the voltage control signal VCTL may be configured to control an on/off state of the switch circuit 188, so as to adjust the grounding path of the antenna unit 120. For example, when the voltage control signal VCTL is in a low level, the first diode D1 and the second diode D2 are capacitive; meanwhile, the first diode D1 and the second diode D2 are cut off. When the voltage control signal VCTL is in high level, the first diode D1 and the second diode D2 are inductive; meanwhile, the first diode D1 and the second diode D2 are turned on. Thus, the antenna unit 120 is equivalently grounded through the pin 122, and therefore the grounding path of the antenna unit 120 is changed. In the present disclosure, the frequency switching circuit 180 is disposed on the circuit board 160, without adjusting paths inside the antenna unit 120. The voltage control signal VCTL controls the on/off state of the switch circuit 188, so that the length of the grounding path of the antenna unit 120 can be adjusted, thereby adjusting the frequency of the antenna unit 120.

In one embodiment, as illustrated in FIG. 1, the low pass fitter 186 may include a capacitor assembly 181 and a inductor assembly 183, where the first end 131 of the capacitor assembly 181 is coupled with the anti-noise unit 184, and the second end 132 of the capacitor assembly 181 is grounded. The first end 133 of the inductor assembly 183 is coupled with the first end 131 of the capacitor assembly 181, and the second end 134 of the inductor assembly 183 is coupled with the first end 135 of the switch circuit 188.

Figure 2:
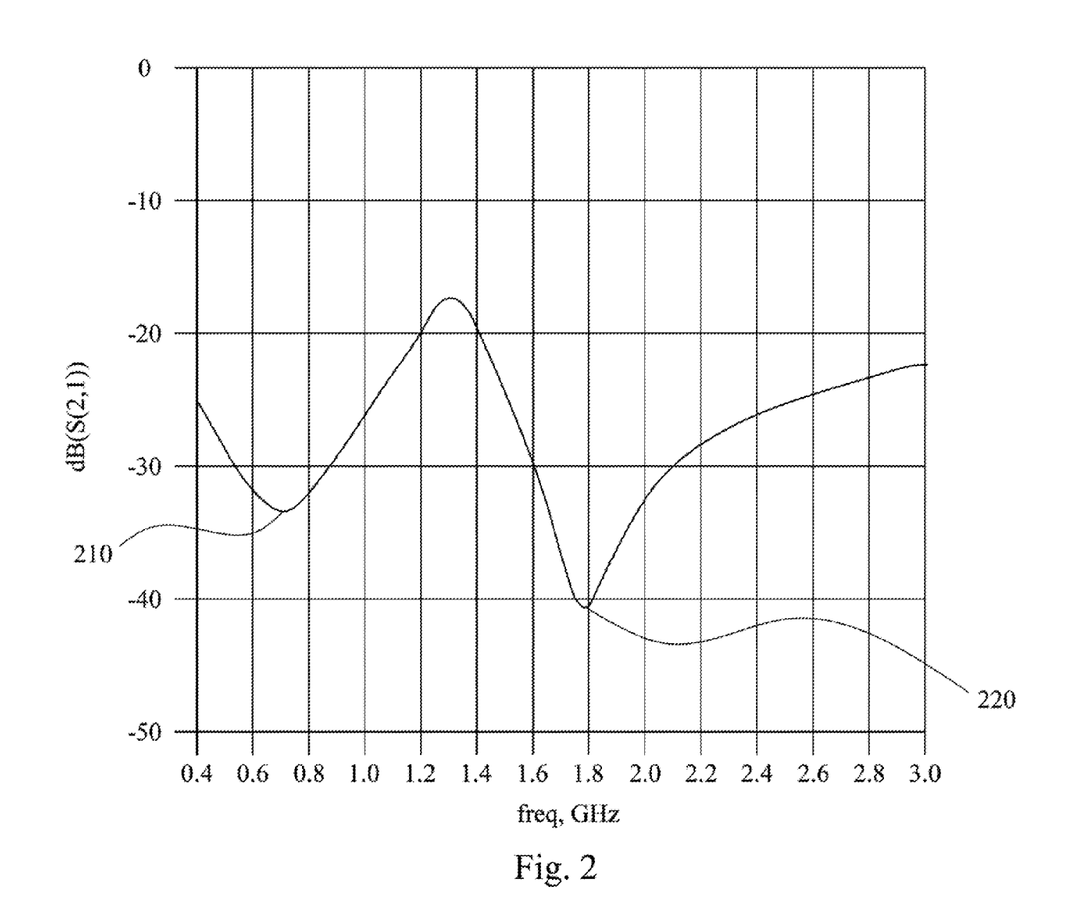
FIG. 2 is a schematic diagram of the transmission coefficients of a low-pass filter associated with capacitance values according to one embodiment of the present disclosure.

In one embodiment, as illustrated in FIG. 1, the capacitor assembly 181 may include a first capacitor C1 and a second capacitor C2, where the first capacitor C1 and the second capacitor C2 are connected in parallel. The capacitance values of the first capacitor C1 and the second capacitor C2 can adjust the transmission coefficients of the low pass filter 186 (S21). Referring to FIG. 2, FIG. 2 is a schematic diagram of the transmission coefficients of a low-pass filter associated with capacitance values according to one embodiment of the present disclosure. As illustrated in FIG. 2, small capacitance values has better filtering effect in the high frequency band 220 only, and large capacitance values has better filtering effect in the low frequency band 210. In the capacitor assembly 181, the first capacitor C1 has the small capacitance value, and the second capacitor C2 has the large capacitance value, so as to get the better filtering effect in the application band of the portable communication device 100.

Figure 3:
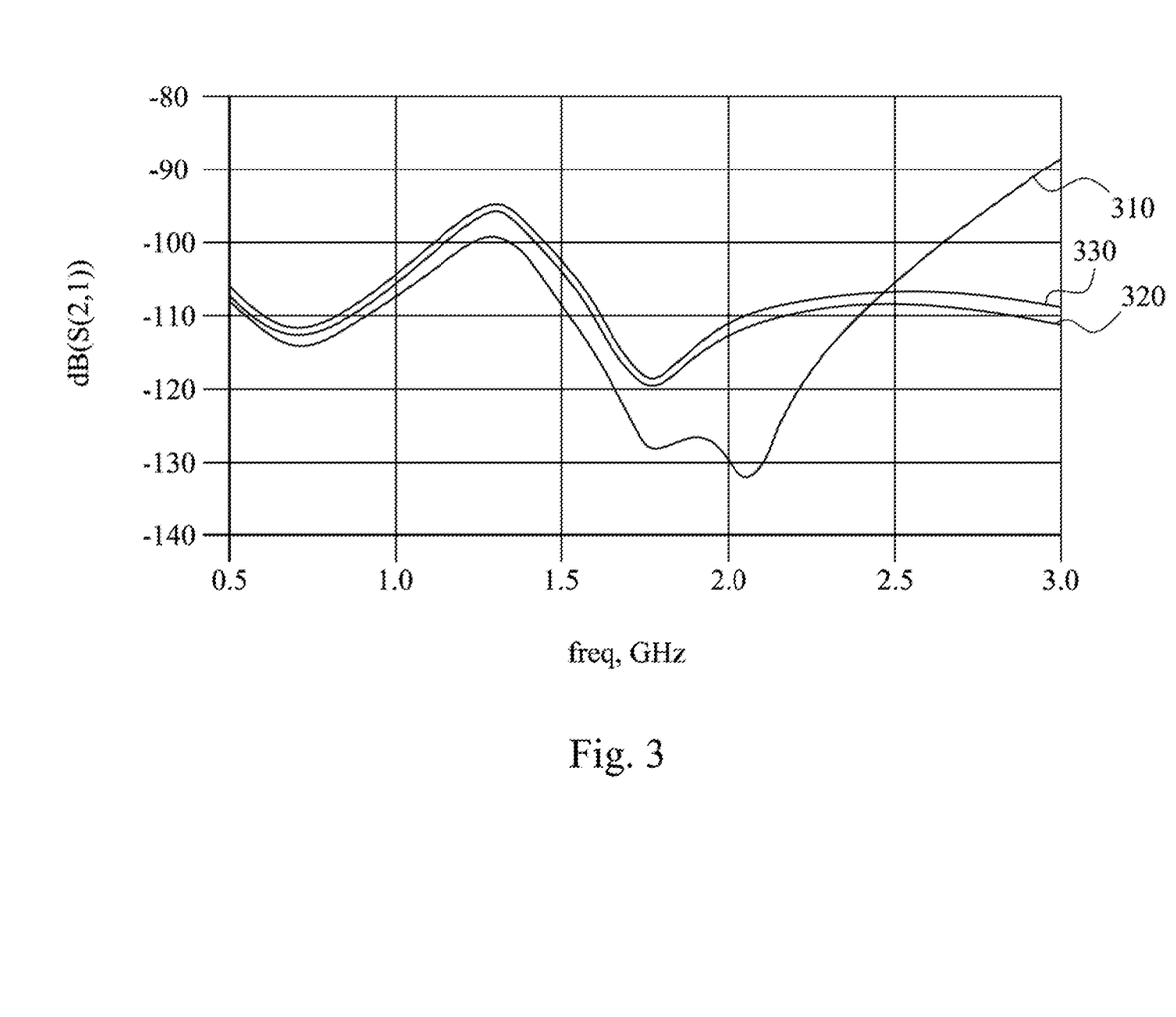
FIG. 3 is a schematic diagram of the transmission coefficients of a low-pass filter associated with inductance values according to one embodiment of the present disclosure.

In one embodiment, as illustrated in FIG. 1, the inductor assembly 183 may include a first inductor L1 and a second inductor L2 connected in series. The inductance values of the first inductor L1 and the second inductor L2 can adjust the transmission coefficients of the low pass filter 186. Referring to FIG. 3, FIG. 3 is a schematic diagram of the transmission coefficients of a low-pass filter associated with inductance values according to one embodiment of the present disclosure. As illustrated in FIG. 3, a large inductance value 310 of the inductor has better filtering effect in low frequency, but its capacitive characteristic is stronger than inductive characteristic in high frequency. Therefore, the filtering effect is poor. In order to get the better filtering effect in the application band of the portable communication device 100, t the first inductor L1 and the second inductor L2 have medium inductance 320 and are connected in series. Thus, the low pass filter 186 has better transmission coefficient in both low and high frequencies. In one embodiment, the first inductor L1 and the second inductor L2 are LQW 12AN devices; when each of the inductance values of the first inductor L1 and the second inductor L2 is 91 nH, the portable communication device 100 has the better filtering effect in its application band.

In one embodiment, the anti-noise unit 184 may include an anti-interference component 185 and a current limit component 187. The anti-interference component 185 is coupled with the signal control terminal 142 and configured to isolate a high frequency noise that is from the processor 140 to the antenna unit 120 and a high frequency signal that is from the antenna unit 120 to the processor 140. In one embodiment, the anti-noise unit 184 may be a ferrite bead (bead) but is not limited thereto.

As illustrated in FIG. 1, the current limit component 187 is coupled with the anti-interference component 185 and the low pass filter 186 and configured to limit the current through the switch circuit 188. Since the output current of the processor 140 is large, the current limit component 187 is used to limit the current through the switch circuit 188 so as to avoid unnecessary power consumption. In this way, minimum current passes through the switch circuit 188 in normal operation, thereby reducing the power consumption of portable communication device 100.

In one embodiment, the current limit component 187 may be a current-limiting resistor, where the resistance value of the current-limiting resistor is decided depending on minimum operation current of the first diode D1 and the second diode D2 but is not limited thereto.

Figure 4:
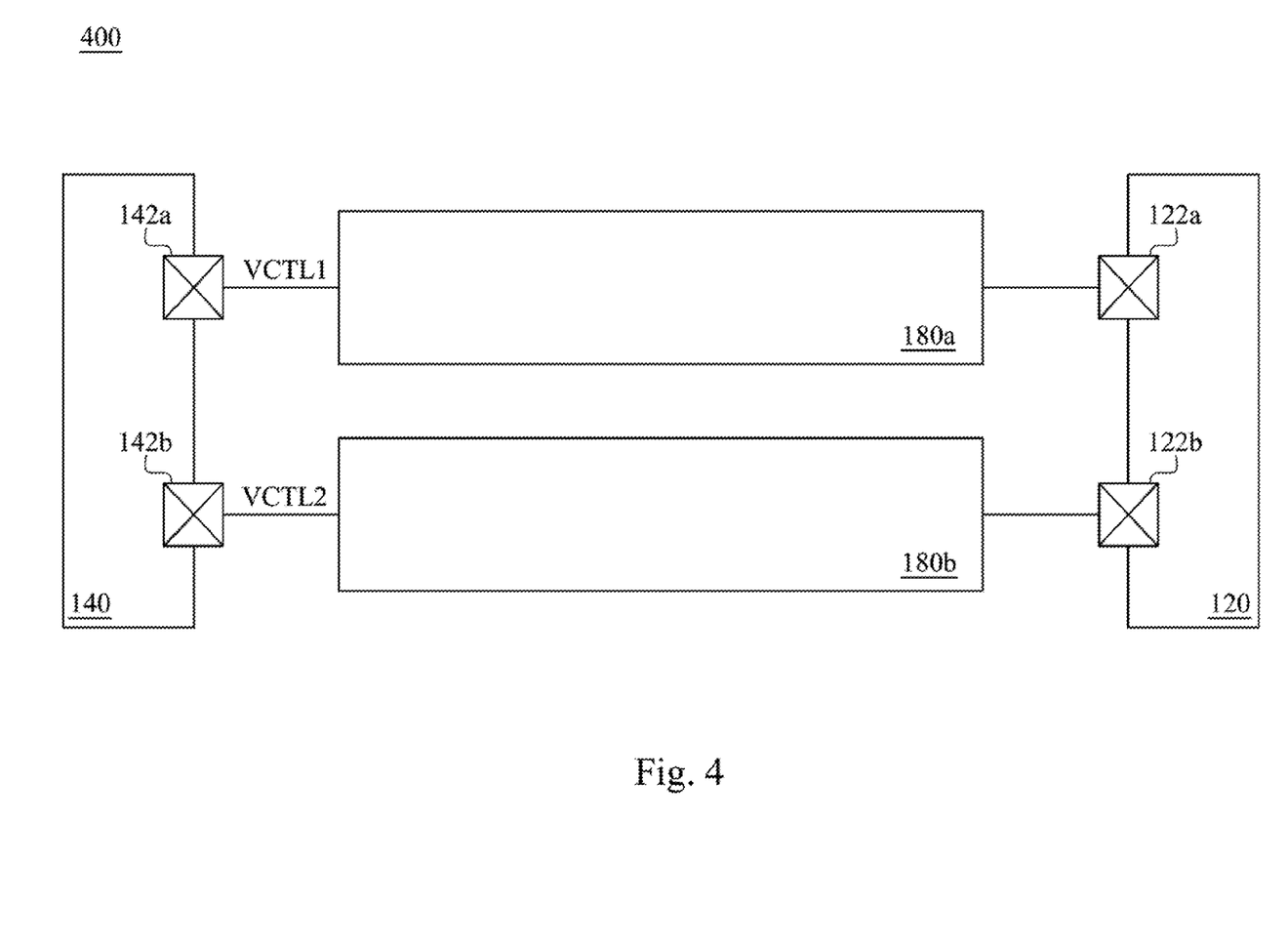
FIG. 4 is a schematic diagram illustrating a planar inverted F antenna applied in the portable electronic device according to one embodiment of the present disclosure.
Figure 5A:
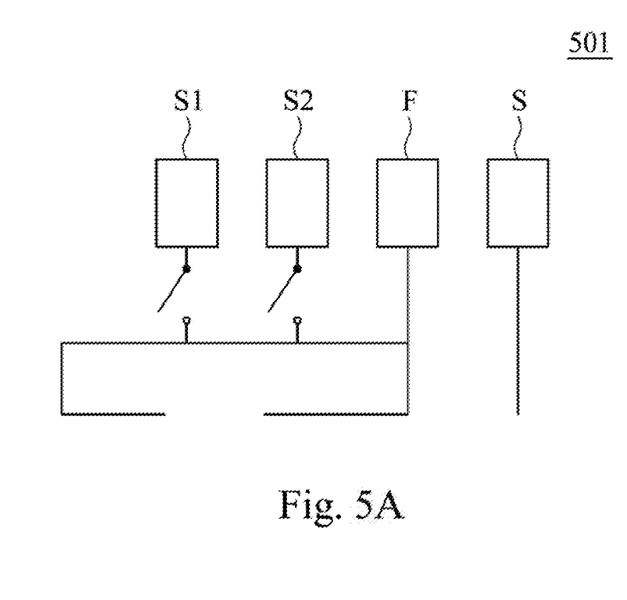
FIG. 5A is a schematic diagram of the planar inverted F antenna according to one embodiment of the present disclosure.

Referring to FIG. 4, FIG. 4 is a schematic diagram illustrating a planar inverted F antenna (PIFA) applied in the portable electronic device according to one embodiment of the present disclosure. Also referring to FIG. 5A, FIG. 5A is a schematic diagram of the planar inverted F antenna 501 according to one embodiment of the present disclosure. S1, S2, F, and S represent the pins of the antenna, where S1 and S2 are switchable pins respectively, and F and S are fixed ground pins respectively.

The portable electronic device 400 using the planar inverted F antenna may include a first pin 122a (i.e., S1 in FIG. 5A) and a second pin 122b (i.e., S2 in FIG. 5A). Therefore, the processor 140 provides a first voltage control signal VCTL1 and a second voltage control signal VCTL2 to adjust the on/off states of respective switch circuits of a first frequency switching circuit 180a and a second frequency switching circuit 180b.

For example, when the first voltage control signal VCTL1 is in the high level, and when the second voltage control signal VCTL2 is in the low high level, the antenna unit 120 is grounded through the first pin 122a, so that a shorter grounding path and lower antenna operation frequency corresponding to this grounding path can be generated. When the first voltage control signal VCTL1 is in the low level, and when the second voltage control signal VCTL2 is in the high level, the antenna unit 120 is grounded through the second pin 122b, so that a higher antenna operation frequency corresponding to this grounding path can be generated.

When the portable electronic device 100 operates in a standby mode, the first voltage control signal VCTL1 and the second voltage control signal VCTL2 both are in the low level, no current pass through the first frequency switching circuit 180a and the second frequency switching circuit 180b, thereby achieving energy saving effect. It should be noted that the first voltage control signal VCTL1 and the second voltage control signal VCTL2 both are not in the high level at the same time, so as to avoid two grounding paths at the same time. If two grounding paths were generated at the same time, the antenna unit 120 could be affected adversely by impedance mismatch.

Figure 5B:
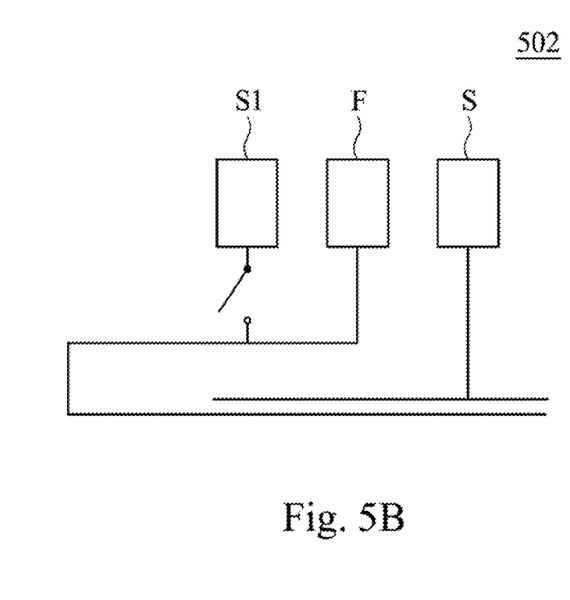
FIG. 5B is a schematic diagram of a coupling feed antenna according to one embodiment of the present disclosure.
Figure 5C:
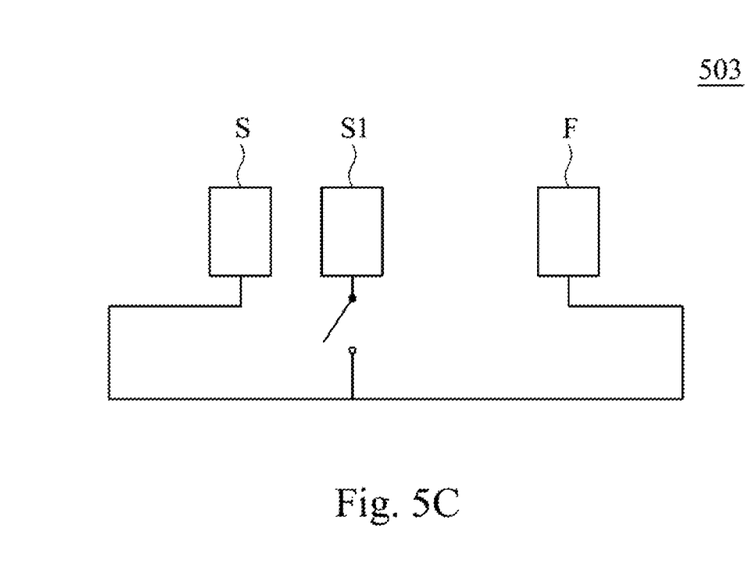
FIG. 5C is a schematic diagram of a loop antenna according to one embodiment of the present disclosure.

Referring to FIGS. 5A to 5C, FIGS. 5A to 5C are schematic diagrams of various antennas according to one embodiment of the present disclosure. S1, S2, F, and S represent the pins of the antenna, where S1 and S2 are switchable pins respectively, and F and S are fixed ground pins respectively.

Referring to FIG. 5A, FIG. 5A is a schematic diagram of the planar inverted F antenna 501 according to one embodiment of the present disclosure. The frequency switching circuit can switch the grounding path of the pin S1 and the pin S2, so as to adjust the operation frequency of this antenna. Referring to FIG. 5B, FIG. 5B is a schematic diagram of a coupling feed antenna 502 according to one embodiment of the present disclosure. The frequency switching circuit can switch the grounding path of the pin S1, so as to adjust the operation frequency of this antenna. Referring to FIG. 5C, FIG. 5C is a schematic diagram of a loop antenna 503 according to one embodiment of the present disclosure. The frequency switching circuit can switch the grounding path of the pin S1, so as to adjust the operation frequency of this antenna.

In view of the above, in the portable electronic device, the processor outputs the voltage control signal to switch the conducting state of the frequency switching circuit disposed on the circuit board, so as to adjust the grounding path of the antenna unit for adjusting the operation frequency of the antenna unit. Thus, the operation bandwidth of the portable electronic device can be improved.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A portable electronic device, comprising:
an antenna unit comprising at least one pin;
a processor comprising at least one signal control terminal and configured to output at least one voltage control signal;
a circuit board; and
at least one frequency switching circuit disposed on the circuit board and electrically connected to the processor and the antenna unit, and the frequency switching circuit comprising:
a switch unit coupled with the pin; and
a anti-noise unit coupled with the signal control terminal and the switch unit,
wherein the at least one voltage control signal configured to switch a conducting state of the at least one frequency switching circuit, so as to adjust a grounding path of the antenna unit, thereby switching the frequency of the antenna unit,
wherein the switch unit further comprises:
a low pass filter, configured to filter out noise between the processor and the antenna unit; and
a switch circuit, wherein the low pass filter comprises a first end coupled with the anti-noise unit and a second end, and the switch circuit comprises a first end coupled with the second end of the low pass filter, a second end coupled with the pin and a third end coupled with a ground.

2. The portable electronic device of claim 1, wherein, as compared with the anti-noise unit, the switch unit is relatively closer to the antenna unit.

3. The portable electronic device of claim 1, wherein the switch circuit at least comprises a first diode and a second diode, the first diode comprises an anode and a cathode, and the second diode comprises an anode and a cathode, wherein the anode of the first diode and the anode of the second diode are coupled with the first end of the switch circuit, the cathode of the first diode is coupled with the third end of the switch circuit, and the cathode of the second diode coupled with the pin.

4. The portable electronic device of claim 1, wherein the voltage control signal configured to control an on/off state of the switch circuit, so as to adjust the grounding path of the antenna unit.

5. The portable electronic device of claim 1, wherein the low pass filter comprises:
a capacitor assembly comprising a first end coupled with the anti-noise unit, and a second end coupled with the ground; and
an inductor assembly comprising a first end coupled with the first end of the capacitor assembly, and a second end coupled with the first end of the switch circuit.

6. The portable electronic device of claim 5, wherein the capacitor assembly comprises a first capacitor and a second capacitor connected in parallel, and a capacity of the first capacitor is different from a capacity of the second capacitor.

7. The portable electronic device of claim 5, wherein the inductor assembly comprises a first inductor and a second inductor connected in series.

8. The portable electronic device of claim 1, wherein the anti-noise unit comprises:
an anti-interference component coupled with the signal control terminal; and
a current limit component coupled with the anti-interference component and the low pass filter, and configured to limit current passing through the switch circuit.

9. The portable electronic device of claim 8, wherein the anti-interference component is a ferrite bead.

10. The portable electronic device of claim 8, wherein the current limit component is a current-limiting resistor.

11. The portable electronic device of claim 1, wherein the antenna unit is a planar inverted F antenna, a coupling feed antenna or a loop antenna.

* * * * *